July 22, 1969   R. H. JONES   3,457,145

LIQUID AND GAS ANALYSIS

Filed June 24, 1965

INVENTOR.
ROBERT H. JONES
BY *Thomas L. Peterson*

ATTORNEY

United States Patent Office 3,457,145
Patented July 22, 1969

3,457,145
LIQUID AND GAS ANALYSIS
Robert H. Jones, Whittier, Calif., assignor to Beckman Instruments, Inc., a corporation of California
Filed June 24, 1965, Ser. No. 466,701
Int. Cl. B01k 3/02
U.S. Cl. 204—1
7 Claims

ABSTRACT OF THE DISCLOSURE

Method and apparatus for determining the chloride ion content of an aqueous stream by saturating the stream with sufficient silver chloride so that the chloride ions in the stream and silver ions and chloride ions from the dissolved silver chloride reach equilibrium with the solid silver chloride, and thus maintain the solubility product relationship. By measuring the aqueous stream with a silver ion sensitive glass electrode system, the original chloride ion content may be calculated. If a chloride gas is to be measured it is first dissolved in an aqueous stream with the remainder of the determination carried out as recited above. The method and apparatus are adapted to measure anions other than chloride ions.

---

Figure 1:
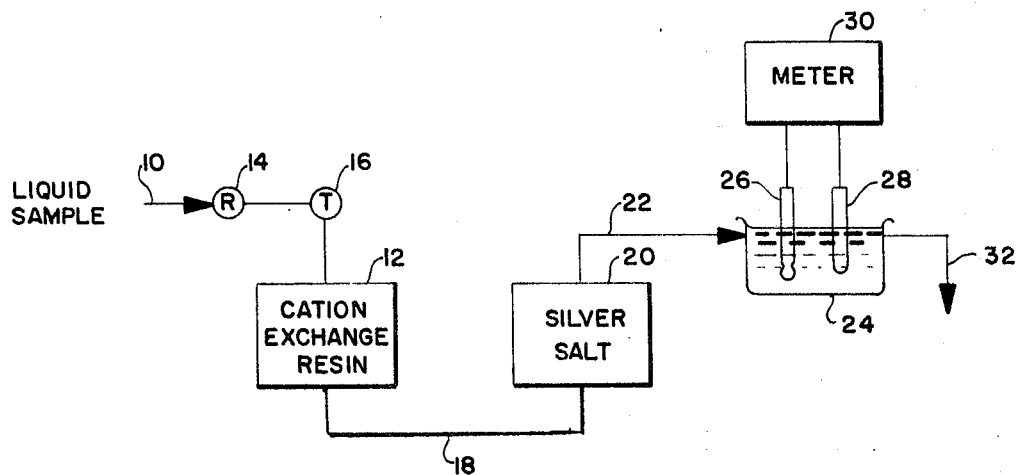

This invention relates generally to methods and apparatus for analyzing liquids and gases and, more specifically, to the determination of the chloride ion content of an aqueous stream and to the monitoring of certain gases.

Although the invention will be described specifically in connection with the determination of the chloride ion content of an aqueous stream or the monitoring of a gas which when dissolved in water produces chloride ions, the invention is applicable to the analysis of liquids containing other anions, if the anion is the anion of a sparingly soluble silver salt, such as silver bromide or silver iodide.

In recent years considerable interest has developed in the measurement of the chloride ion concentration in the ranges from 0 to 10 parts per million because of the highly corrosive nature of waters containing chloride ions on stainless steel and other materials. Presently, these low ranges of chloride ion concentration are being determined by manual titrations with mercury salt or by a colorimetric method involving mercuric thiocynate; however, these methods have not been widely acceptable to the industry. Attempts have also been made to use a silver-silver chloride electrode together with a conventional pH reference electrode for the determination of the chloride ion concentrations of liquids. However, the silver-silver chloride sensing electrodes have not been found to be suitable because of interfering substances such as oxidants or reductants often found in waters where the low chloride ion concentration determination is required.

It is, therefore, the principal object of the present invention to provide a method and apparatus for measuring extremely low levels of chloride ion concentration in aqueous streams without the determination being affected by interfering substances.

Another object of the invention is to provide a method and apparatus for determining the anion content of an aqueous stream utilizing a sparingly soluble silver salt where the anion being determined is the same as the anion of said salt.

A further object of the invention is to provide a method and apparatus for monitoring gas streams for the level of a constituent which, when dissolved in an aqueous stream, produces an anion which is the anion of a sparingly soluble silver salt.

According to a principal aspect of the present invention, the anion content of an aqueous stream is determined, where said anion is the anion of a sparingly soluble silver salt, by saturating the stream with the silver salt so that said anions in the stream and the silver ions and anions from the dissolved silver salt will reach equilibrium with the solid salt to satisfy the solubility product relationship of the silver ions and said anions in equilibrium with the solid silver salt. Thereafter, the changes in the silver ion content of the aqueous stream resulting from the equilibrium of silver ions and said anions with the solid salt is measured as a function of said anion content of the original stream. Since said anion content of the aqueous stream is determined indirectly by measuring the resulting silver ion content of the stream, a glass electrode sensitive to silver ions may be utilized which is not subject to interference by other substances often found in aqueous streams which interfere with chloride ion analysis if a silver-silver chloride electrode is used. Also, because the glass electrode may be used as the sensing electrode in this analysis, the measurement will not be influenced by oxidants and reductants in the stream.

According to an additional aspect of the invention, a gas stream is monitored for a constituent which, when said stream is dissolved in water, produces an anion that is the anion of a sparingly soluble silver salt. In this method, the gas is first mixed with substantially pure water to dissolve said constituent therein thereby producing an anion in the aqueous stream which may be determined by the method described above. Consequently, by this embodiment of the invention, trace measurements of gaseous hydrogen chloride or similar gases may be made.

Figure 2:
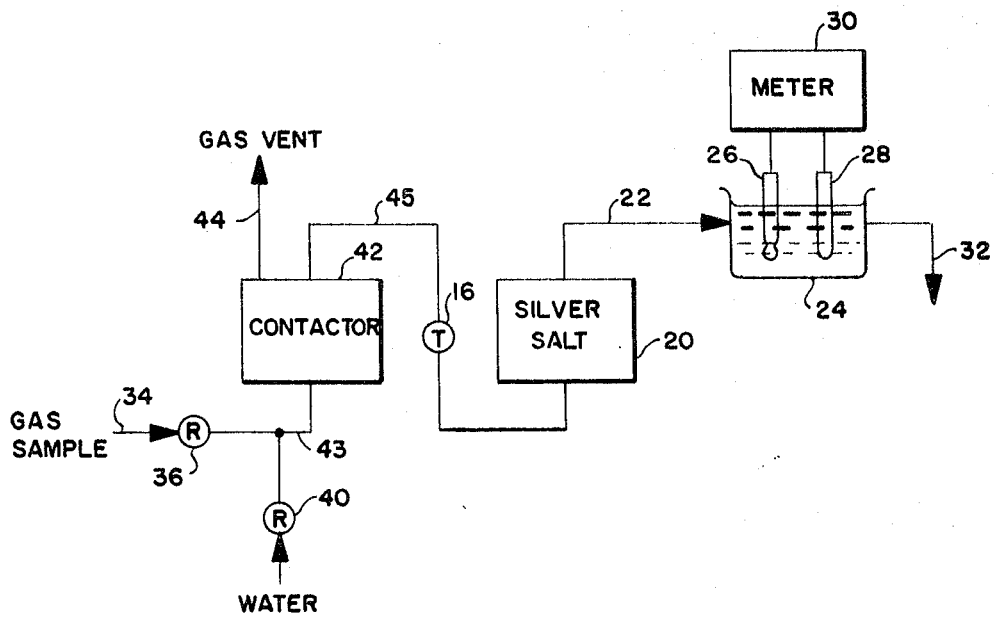

These and other objects, aspects and advantages will become more apparent from the following description taken in connection with the accompanying drawing wherein:

FIG. 1 is a flow diagram showing a preferred form of the invention for the analysis of liquids; and FIG. 2 is a flow diagram showing a preferred form of the invention for the analysis of gases.

In the preferred form of the invention for analyzing both liquids and gases, there is used as the means for measuring the silver ion content of an aqueous stream a silver ion sensitive glass electrode as described in copending patent application entitled "Method of Measuring Silver Ion Concentration" by Allan L. Budd, Ser. No. 257,009, now Patent No. 3,278,399 dated Oct. 11, 1966 assigned to the assignee of the present application. As described in said copending application, certain alkali-alumina-silica glasses have been found to be capable of measuring the silver ion concentration of a solution, even in the presence of hydrogen, sodium and potassium ions. Examples of suitable glass compositions which may be utilized for the silver ion sensitive bulbs of the glass electrodes used in the method of the present invention, expressed as a prefusion composition and the proportions being given in parts by weight, are a glass containing silica sand 11.4, lithium carbonate 6.0, and aluminum hydrate 7.8 and a glass containing silica sand 12.45, sodium carbonate 8.55 and aluminum nitrate 9.0. Although such electrodes are generally selectively sensitive to silver ions in the presence of potassium, sodium and hydrogen ions, if solutions are encountered in which there is a high background of sodium ions, with the silver concentrations very small, the measurement of the silver ion concentration of the solution might be affected by the interference caused by the sodium ions. This factor is taken in consideration in the preferred form of the present invention.

According to the preferred form of the invention for analyzing anions such as chloride in an aqueous stream, a stream is passed at a relatively low, but not necessarily highly constant flow rate to a temperature controller where the temperature of the stream is controlled within the limits of approximately ±2° C. of 25° C. The temperature controlled aqueous stream is then passed through a cation exchange resin where the sodium ions in the stream are exchanged for other cations to whose concentration changes the above-mentioned glass electrode is not responsive. Following the cation exchange, the stream is then saturated with silver chloride, if chloride ions are being measured, so that the chloride ions in the stream and silver ions and chloride ions from the dissolved silver chloride reach equilibrium with the solid silver chloride according to the chemical equation:

$$AgCl_{(solid)} + H_2O \rightleftharpoons Ag^+ + Cl^-$$

and satisfy the solubility product relationship:

$$K_{sp} = (Ag^+)(Cl^-)$$

where $(Ag^+)$ and $(Cl^-)$ are the molar concentrations of silver and chloride ions after saturation of the stream with the silver chloride. When the stream temperature is maintained about 25° C., the value $K_{sp}$ is approximately $1 \times 10^{-10}$. After equilibrium is reached, the stream is directed to a measuring cell where the silver ion content of the stream is measured by a silver ion sensitive glass electrode as described above. Since $(Ag^+)$ changes in accordance with $(Cl^-)$ to maintain the solubility product relationship, which is constant for any particular temperature, then the $(Cl^-)$ may be readily determined. Therefore, by this invention, the chloride ion content of an aqueous stream may be determined indirectly by measuring the silver ion content of the stream after saturation with silver chloride. The use of the cation exchange resin is of importance when the aqueous stream being analyzed contains sodium ions, particularly where the sodium ion concentration is relatively high, so that the sodium ions are removed from the stream before it reaches the silver ion sensitive glass electrode. If the sodium ions are not removed, the silver ion measurement might be adversely affected if a substantial concentration of sodium ions are present in the incoming aqueous stream.

Although the method above has been described specifically for the determination of chloride ions in an aqueous stream, as indicated before, the method is also applicable to the determination of other anions if there is available a sparingly soluble silver salt having the same anion. For example, the method may be used for determining either the bromide or iodide ion content of an aqueous stream when silver bromide and silver iodide, respectively, are used to saturate the stream.

An apparatus for measuring the chloride ion content of an aqueous stream is shown in FIG. 1. The apparatus includes an inlet line 10 for the aqueous stream which is connected to a chamber 12 containing a cation exchange resin. A flow regulator 14 is provided in the line so that the sample stream will pass at a relatively low rate to ensure that the analysis will not be disturbed because of incomplete saturation by the silver salt as might occur if too high a flow were provided. However, it is not necessary that the flow rate be highly constant in this method of the invention. A temperature controller 16 is also provided in the line 10 for maintaining the temperature of the incoming aqueous stream substantially constant.

The amount of solid silver chloride dissolved in the stream will change appreciably with temperature when the chloride ion content of the incoming sample stream is low because the solubility of silver is not suppressed as would be the case if the chloride ion content of the sample stream were high. Therefore, the temperature controller is of utmost importance when the chloride ion content of the stream is low. However, if the chloride ion content of the stream is relatively high, the temperature controller could be eliminated and relatively accurate determinations of the chloride ion content still could be made.

The cation exchange resin in chamber 12 is provided to remove any sodium ions which might exist in the stream and exchange those ions with other cations which will not interfere with the measurement of silver ions subsequently in the analysis. Examples of suitable cations exchange resins are Rohm and Haas IR. 120 and Dowex 50, a product of the Dow Chemical Company.

The effluent from the chamber 12 is delivered through a line 18 to a saturation chamber 20 which contains silver chloride when the chloride ion concentration of the sample stream is being determined. The silver chloride is provided in solid form and in a sufficient amount to allow the aqueous stream to become completely saturated with silver chloride so that the chloride ions in the sample stream and silver and chloride ions from the slightly soluble silver chloride will reach chemical equilibrium with the solid silver chloride. Therefore, the effluent from the chamber 20 passing through the line 22 to the container 24 will have a silver ion content which is a function of the chloride ion concentration of the incoming stream as explained previously. A glass electrode 26 having a silver ion sensitive glass bulb and a reference electrode 28 are immersed in the solution in the container 12 and are connected to a conventional high impedance voltmeter 30 for measuring the silver ion content of the stream. The stream leaves the container 24 through an outlet 32. It is to be understood that the meter 30 may read in terms of silver ion content or may be calibrated directly in chloride ion content if the temperature is maintained constant as by the controller 16.

It is to be further understood that the cation exchange resin in the chamber 12 may be eliminated if the aqueous stream contains no or few sodium ions which would interfere in the silver ion measurement of the effluent from the chamber 20.

The concept of utilizing a silver salt for saturating an aqueous stream to determine an anion of the salt may also be utilized in the analysis of certain gases containing other constituents which, when dissolved in an aqueous solution, produce the anion of said salt. Therefore, if it is desired to measure gaseous hydrogen chloride, for example, the sample gas stream is dissolved in substantially pure water to dissolve the hydrogen chloride therein, thus producing chloride ions. Then the stream containing the chloride ions is delivered to a silver chloride saturation chamber and thereafter to a silver ion sensing measuring cell as described above in connection with the invention illustrated in FIG. 1.

There is illustrated in FIG. 2 the preferred form of an apparatus for monitoring a gas containing a constituent such as hydrogen chloride. The parts in the apparatus in FIG. 2 which are the same as those illustrated in FIG. 1 are referred to by like reference numerals. The gas sample is delivered into the apparatus through an inlet line 34, the flow of the gas being controlled by a flow regulator 36 in the line. The water used in the process enters the apparatus through a second inlet line 38 having therein a second flow regulator 40. The gas and water enter a contactor 42 through a line 43 where the constituent in the gas being measured dissolves completely in the water thereby forming chloride ions and the insoluble component of the gas stream separates from the water and exists from the contactor 42 via a vent 44. The effluent from the contactor 42 passes through a line 45 to the saturation chamber 20 containing silver chloride and the effluent from the chamber 20 passes to the silver ion sensing electrode 26 as in the apparatus illustrated in FIG. 1. It is desirable to provide a temperature controller in this apparatus for the same reasons as in the apparatus shown in FIG. 1. The temperature controller may be located between the contactor 42 and saturation chamber 20 in the line 45; although, it could also be positioned in the line 43.

In utilizing the apparatus in FIG. 2, the sample gas stream and substantially pure water are delivered to the lines 34 and 38, respectively, at a predetermined and constant flow rate so that when the silver ion concentration of the effluent from the chamber 20 is measured, the chloride ion concentration and, therefore, the amount of hydrogen chloride in the sample gas, may be indirectly determined.

As in the method of analyzing liquid streams for chloride or other similar anions, the apparatus of FIG. 2 may be utilized for measuring gases containing constituents other than hydrogen chloride, if the constituent produces an anion when dissolved in water which is the anion of a sparingly soluble silver salt, for example, hydrogen iodide or hydrogen bromide.

Although several embodiments of the invention have been disclosed herein for purposes of illustration, it will be understood that other applications of the invention are possible and modifications of the embodiments disclosed and discussed herein may be made without departing from the spirit of the invention, the scope of which is defined by the following claims:

What is claimed is:

1. In a process for monitoring a gas stream for a constituent which, when said constituent is dissolved in water, produces an anion that is the anion of a sparingly soluble silver salt, the steps comprising:
    mixing said gas stream with a stream of substantially pure water to dissolve said constituent in said water to produce said anion;
    saturating said water stream with said silver salt so that said anion in said water stream and the silver ions and the anions dissolved from said salt reach chemical equilibrium with said salt; and
    measuring the change in the silver ion content of the water stream resulting from said equilibrium as a measure of the level of said constituent in the gas stream.

2. A process as set forth in claim 1 wherein said measuring is accomplished by contacting the water stream with a silver ion sensitive glass electrode and reference electrode joined by a high impedance voltmeter.

3. A process as set forth in claim 1 including the additional step of maintaining the temperature of said water stream substantially constant during at least the saturating and measuring steps.

4. A process as set forth in claim 1 wherein said constituent is HCl, said anion is chloride and said salt is silver chloride.

5. An apparatus for monitoring a gas stream for a constituent which, when said stream is dissolved in water, produces an anion that is the anion of a sparingly soluble silver salt comprising:
    first means for dissolving said constituent in the gas in water;
    means for supplying said gas stream and water to said dissolving means to produce an anion bearing aqueous stream;
    a chamber containing said silver salt in sufficient amount to saturate said anion bearing aqueous stream;
    second means for supplying said aqueous stream from said dissolving means to said chamber;
    means for measuring the silver ion content of an aqueous stream; and
    means for conducting the stream from said chamber to said measuring means for measuring the silver ion content of said stream as a function of the level of said constituent in the gas stream.

6. An apparatus as set forth in claim 5 including means in said first supplying means for regulating the rate of flow of said gas stream and said water.

7. An apparatus as set forth in claim 5 including temperature controlling means between said first supplying means and said chamber.

References Cited

UNITED STATES PATENTS

| | | | |
|---|---|---|---|
| 2,171,809 | 9/1939 | Spence. | |
| 2,230,593 | 2/1941 | Hassler | 204—195 X |
| 2,609,341 | 9/1952 | Juda | 210—38 |
| 3,278,399 | 10/1966 | Budd | 204—1 |
| 3,349,012 | 10/1967 | Solomons | 204—1.1 |

OTHER REFERENCES

Deming, H. G.: Fundamental Chemistry, 2nd ed. (1947), John Wiley & Sons Inc., N.Y., pp. 482–484, 492.

Pauling, L.: General Chemistry, (1947), W. H. Freeman & Co., San Francisco, pp. 417–419, 425.

MORRIS O. WOLK, Primary Examiner

ELLIOTT A. KATZ, Assistant Examiner

U.S. Cl. X.R.

23—232, 254